United States Patent [19]

Syria et al.

[11] Patent Number: 4,634,827
[45] Date of Patent: Jan. 6, 1987

[54] ELECTRICAL DISCHARGE MACHINING APPARATUS INCLUDING GAP CONDITION DETECTION CIRCUITRY

[75] Inventors: Roland L. Syria, Utica; John J. Purrett, Troy; Eric Jefferson, Detroit, all of Mich.

[73] Assignee: Xermac, Inc., Royal Oak, Mich.

[21] Appl. No.: 702,130

[22] Filed: Feb. 15, 1985

[51] Int. Cl.$^4$ .......................... B23H 1/02; B23H 7/18
[52] U.S. Cl. ................................. 219/69 G; 219/69 C
[58] Field of Search ................. 219/69 G, 69 C, 69 S, 219/69 P; 204/129.5

[56] References Cited

U.S. PATENT DOCUMENTS

| | | | |
|---|---|---|---|
| 2,939,065 | 5/1960 | Matulaitis | 219/69 G |
| 2,996,638 | 8/1961 | Webb | 219/69 G |
| 3,437,781 | 4/1969 | Webb | 219/69 G |
| 3,525,843 | 8/1970 | Batterson | 219/69 G |
| 3,531,615 | 9/1970 | Zammit | 219/69 G |
| 3,539,753 | 11/1970 | Ullmann et al. | 219/69 C |
| 3,590,205 | 6/1971 | Syria et al. | 219/69 G |
| 3,627,968 | 12/1971 | Sennowitz | 219/69 C |
| 3,655,937 | 4/1972 | Ullmann et al. | 219/69 P |
| 3,745,298 | 7/1973 | Malesh | 219/69 C |
| 3,793,502 | 2/1974 | Bell, Jr. | 219/69 C |
| 3,816,692 | 6/1974 | Ratmansky | 219/69 C |
| 3,883,793 | 5/1975 | Mizuhara et al. | 219/69 C |
| 3,916,138 | 10/1975 | Pfau | 219/69 C |
| 3,943,321 | 3/1976 | Pfau et al. | 219/69 P |
| 3,973,104 | 8/1976 | Ullmann et al. | 219/69 P |
| 4,009,361 | 2/1977 | Stanton et al. | 219/69 C |
| 4,072,842 | 2/1978 | Ullmann et al. | 219/69 C |
| 4,338,504 | 7/1982 | Gray | 219/69 G |
| 4,367,400 | 1/1983 | Otto et al. | 219/69 G |

FOREIGN PATENT DOCUMENTS

| | | | |
|---|---|---|---|
| 58-66626 | 4/1983 | Japan | 219/69 C |
| 59-42221 | 3/1984 | Japan | 219/69 C |

Primary Examiner—A. D. Pellinen
Assistant Examiner—Geoffrey S. Evans
Attorney, Agent, or Firm—Brooks & Kushman

[57] ABSTRACT

Electrical discharge machining (EDM) apparatus includes an arc protection circuit which monitors the values of the ignition voltages applied across the gap between an electrode and a workpiece. A signal conditioning circuit includes a peak detector and averaging circuit conditions the voltage appearing across the gap and the arc protection circuit compares the value of the conditioned signal to the value of one of two reference voltage signals depending on whether the gap ignition voltages are increasing or decreasing. When the ignition voltages have decreased below the first reference level, the arc protection circuit provides a first control signal which causes a servo drive mechanism to increase the distance between the electrode and the workpiece. The first control signal also causes a pulse generator circuit to increase the off time between successive electrical discharges. When the ignition voltages have subsequently increased above a second, lower reference level the arc protector circuit provides a second control signal. The second control signal causes the servo drive mechanism to return to its programmed cutting position and the pulse generator circuit to return to its normal operating mode.

5 Claims, 3 Drawing Figures

ELECTRICAL DISCHARGE MACHINING APPARATUS INCLUDING GAP CONDITION DETECTION CIRCUITRY

TECHNICAL FIELD

This invention relates to electric discharge machining (EDM) apparatus and, in particular, to EDM apparatus including gap condition detection circuitry which provides control signals to a servo drive mechanism and pulse generator circuitry of the apparatus.

BACKGROUND ART

Electrical discharge machining (EDM) is based on the principle of erosion of metal by spark discharges. The spark comprises a transient electric discharge to the space between two charged electrodes which are called the tool (or moving electrode) and the workpiece. The discharge occurs when the potential difference between the tool and the workpiece is large enough to cause a breakdown in the intervening fluid medium to procure an electrically conductive spark channel. Spark initiation occurs in the order of one microsecond, followed by a rapid increase in plasma temperature to the order of 20,000° F. and widening of the spark into a relatively thin flat disc. Heat transfer from the plasma to both the tool and the workpiece melts, partially vaporizes, and partially ionizes the metal in a thin surface layer.

EDM is often carried out in a moving, filtered dielectric fluid such as kerosene. The fluid in the work gap, (i.e. approximately 0.0005 to 0.005 inches) is always contaminated with spherical solidified particles of work and tool material which has just been eroded. It is thought that the presence of these metallic spheres produces relatively high conducting paths from tool to workpiece.

Because the spacing between the tool and workpiece is critical, the movable tool or electrode is commonly controlled by a servo mechanism.

The rate of metal removal depends to a large extent on the average current in the discharge circuit. It is also a function of the electrode characteristics, the electrical parameters and the nature of the dielectric fluid. The rate of metal removal is influenced by the electrical conductivity of the workpiece, but not by the hardness of the material. Thus, as long as the workpiece material is electrically conductive it can be satisfactorily cut. Materials that may be cut in such a fashion include not only metals such as high-speed steel, heat-treated tool steel and titanium, but also semi-conductors such as gallium, silicon and germanium and sandwich-type combinations such as sintered cutting material on a steel body, with or without a backing layer. The rate of removal is normally varied by changing the number of discharges per second or the energy per discharge.

The EDM process has numerous applications such as machining cavities and dies, cutting small-diameter holes, blanking parts from sheets, cutting off rods of materials with poor machinability and flat or form grinding.

For satisfactory EDM to take place, the spark must be completely quenched between charging cycles. If the spark is not completely quenched between charging cycles, arcing occurs (i.e. the spark is continuous). Arcing is most undesirable in that it produces gross surface damage to a substantial depth and also reduces the average efficiency of metal removal.

Numerous prior art patents have addressed the problems of arcing and the other problems associated with the critical mechanical and electrical parameters of the EDM process which must be controlled. For example, U.S. Pat. Nos. to Lobur 3,721,795, Syria et al 3,590,205 and Balleys et al 4,049,942 all disclose various electrical and mechanical mechanisms to control the EDM apparatus.

Similarly, the U.S. Pat. Nos. of Verner et al 3,697,719, Lobur 3,749,877, Sennowitz 3,761,673 and Wohlabaugh 3,843,864 all deal specifically with the current arcing problem.

The U.S. Pats. Nos. to Holliday 3,697,879, Sennowitz 3,808,392 and Wohlabaugh 3,996,445 all deal with the generation of timing pulses utilized in the EDM process.

The U.S. Pat. No. to Wohlabaugh 3,887,782 discloses the use of a vibrating electrode for flushing of the dielectric.

DISCLOSURE OF THE INVENTION

An object of the present invention is to provide an EDM apparatus which overcome many of the arc protection problems associated with the prior art arc protection circuits.

Another object of the present invention is to provide an EDM apparatus including arc protection circuitry especially useful in the cutting of deep holes wherein the ignition voltages of the pulses applied across the gap between an electrode and its workpiece are monitored.

Yet still another object of the present invention is to provide an EDM apparatus including arc protection circuitry which provides control signals to modify the machining parameters and the duty cycle of the eltrical discharges during the cutting of deep holes without sacrificing valuable machining time.

In carrying the above objects and other objects of the present invention an EDM apparatus constructed in accordance with the present invention includes first generating means for generating intermittent electrical discharges between an electrode and a workpiece. Each of the discharges has a voltage waveform including an ignition voltage and a cutting voltage. The value of the cutting voltage is less than the value of the ignition voltage. The apparatus also includes regulating means for regulating the relative displacement between the electrode and the workpiece and conditioning means for conditioning the voltage waveform to provide a conditioned voltage signal relating to the magnitudes of the ignition voltages. The magnitudes of the ignition voltages define a discharge envelope. The apparatus also includes second generating means for generating first and second reference voltage signals. The value of the first reference voltage signal is greater than the value of the second reference voltage signal. Determining means alternatively determines when the value of the conditioned voltage signal is below the value of the first reference voltage signal and provides a first control signal. The regulating means is responsive to the first control signal to increase the displacement between the electrode and the workpiece. The duty cycle of the first generating means also decreases in response to the first control signal.

Preferably, the determining means determines when the value of the conditioned voltage signal is greater than the value of the second reference voltage signal to provide a second control signal. The regulating means decreases the displacement between the electrode and the workpiece in response to the second control signal and the duty cycle of the first generating means also increases in response to the second control signal.

Also, preferably, the conditioning means comprises a peak detector and averaging circuit. The determining means includes a voltage comparator coupled to the conditioning means for alternately comparing the value of the conditioned voltage signal with the values of the first and second reference voltage signals.

The first generating means is preferably responsive to the first and second control signals to respectively increase and decrease the time period between successive electrical discharges.

The advantages of the above apparatus are numerous especially during the cutting of deep holes wherein gap contamination is likely to occur. In particular, when the ignition voltages appearing across the gap between the electrode and the workpiece have dropped below a first reference voltage, the circuitry provides a control signal to increase the distance between the electrode and the workpiece and also to modify the duty cycle of the first generating means. The circuitry provides a dynamic reference voltage change so that the electrode is displaced away from the workpiece only to the extent necessary to eliminate the contamination problem. As a result, better cutting times are achieved.

Other advantages of the present invention will be readily appreciated as the same becomes better understood by reference to the following detailed description when considered in connection with the accompanying drawings.

BEST MODE FOR CARRYING OUT THE INVENTION

Figure 1:
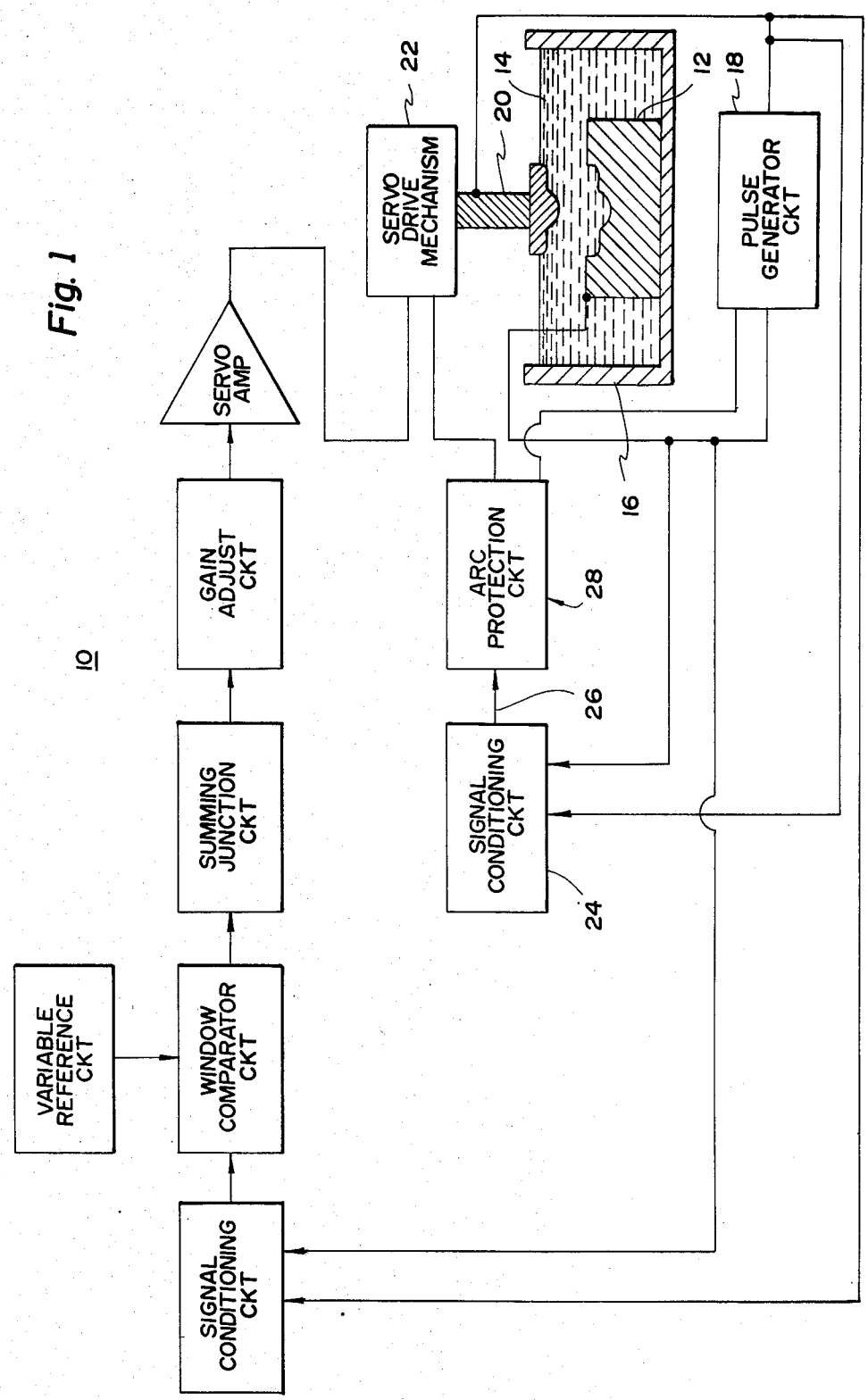
FIG. 1 is a combined electrical and mechanical schematic view of an EDM apparatus constructed in accordance with the present invention.

Referring now to FIG. 1 there is illustrated an electrical discharge machining (EDM) apparatus collectively indicated at 10 for eroding a workpiece 12 to a desired configuration. As illustrated, the workpiece 12 is submerged in a dielectric fluid 14 contained within a rectangular container 16. A first generating means or pulse generator circuit 18 generates intermittent electrical discharges between an electrode 20 and the workpiece 12. Each of the discharges has a voltage waveform including an ignition voltage and a cutting voltage. The value of the cutting voltage is less than the value of the ignition voltage, as is well known in the art. A regulating means or servo drive mechanism 22 regulates the displacement between the electrode 20 and the workpiece 12.

Figure 3:
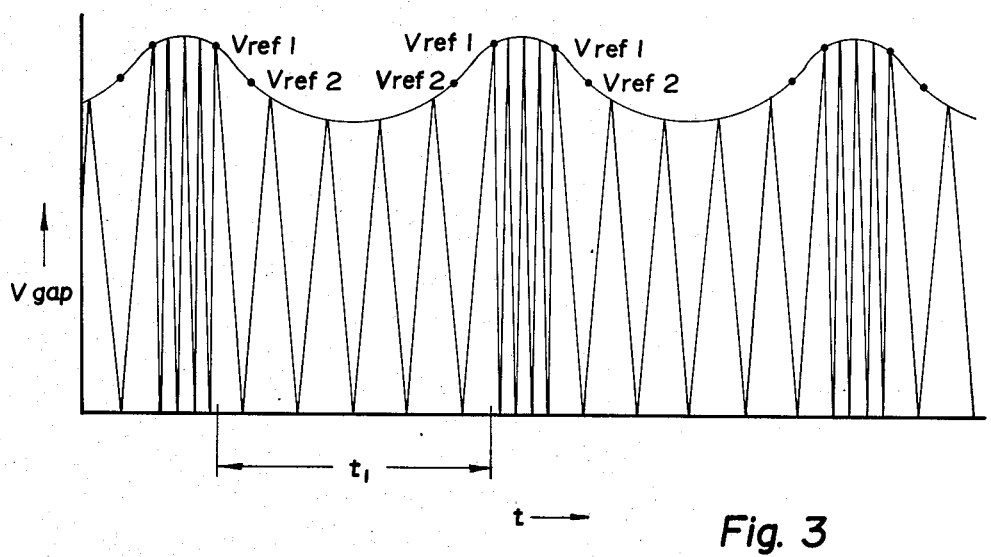
FIG. 3 is a diagram illustrating an envelope defined by the pulse ignition voltages.

The apparatus 10 includes conditioning means or a signal conditioning circuit 24 which preferably comprises a conventional peak detector and averaging circuit which conditions the voltage waveforms appearing across the gap between the electrode 20 and the workpiece 12. In particular, the circuit 24 senses the magnitude of the ignition voltages appearing across the gap as is shown in the sinusoidal, envelope wave form as shown in FIG. 3.

Figure 2:
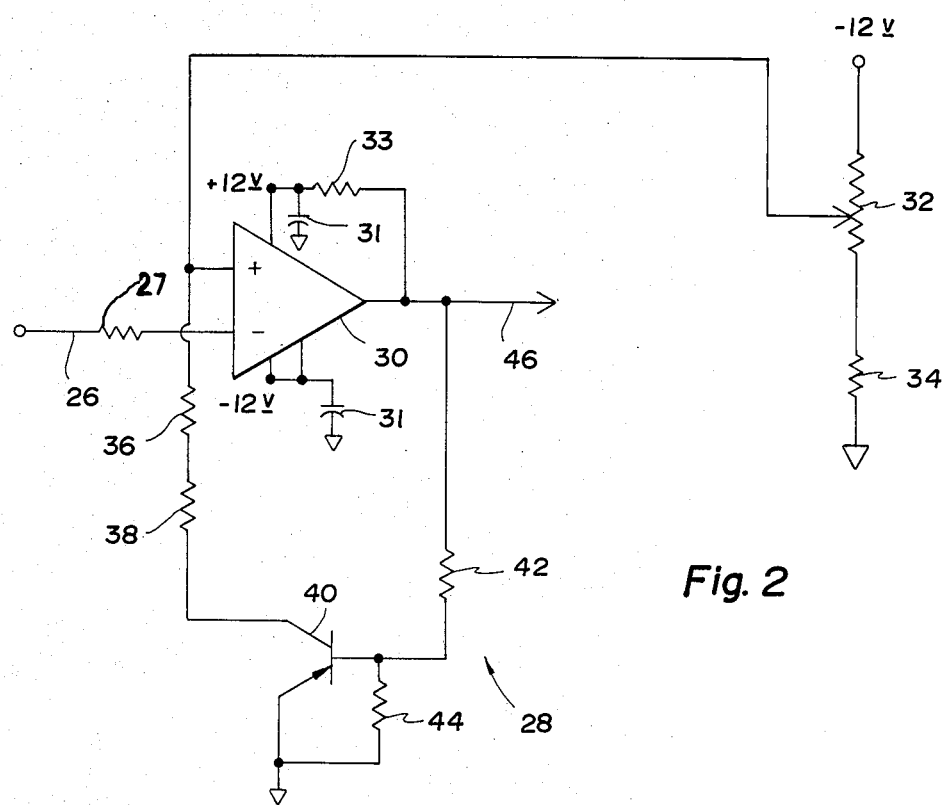
FIG. 2 is an electrical schematic view of an arc protection circuit constructed in accordance with the present invention.

The voltage envelope appears on a line 26 and is input into an arc protection circuit, generally indicated at 28 in FIGS. 1 and 2. The arc protection circuit 28 includes a voltage comparator 30 the inverting input of which is coupled to the line 26 through a resistor 27. The circuit 28 includes a grounded capacitor 31 and a biased resistor 33 connected in parallel and also to the output of the comparator 20. The positive or non-inverting input of the comparator 30 is alternately coupled to a primary cutoff reference voltage generated by a biased, variable resistor 32 and a grounded, serially connected resistor 34 or to a secondary cutoff reference voltage generated by the resistor 32 and a pair of serially connected resistors 36 and 38.

The circuit 28 includes a transistor 40 which, in its blocking mode, causes the primary cutoff reference voltage to be applied to the positive or non-inverting input of the comparator 30. When the transistor 40 is turned "on", the secondary cutoff reference voltage is applied at the positive input of the comparator 30.

The circuit 28 also includes a resistor 42 connected between the output of the comparator 30 and the base of the transistor 40 and a second resistor 44 connected between the base of the transistor 40 and ground.

Referring now to FIG. 3, as long as the ignition voltage is above the primary cutoff reference voltage (i.e. $V_{Ref1}$), the comparator 30 acts as an open switch. As a result the transistor 40 remains in its "off" state. However, when the voltage level appearing on line 26 goes below the primary cutoff reference voltage, the comparator 30 acts as a closed circuit and a relatively large voltage control signal appears at output line 46. When this occurs, the transistor 40 switches to its "on" state, thereby causing the secondary cutoff reference voltage (i.e. $V_{Ref2}$) to be applied at the positive input of the comparator 30. The control signal appearing at the output line 46 of the comparator 30 signals the servo drive mechanism 22 to back off the electrode 20 and also signals the pulse generator circuit to increase the off time between electrical discharges as shown by the decreased frequency of the electrical discharges during time, $T_1$ in FIG. 3. Alternately, the duty cycle may be decreased in other ways by modifying the pulse train The ignition voltage thereafter quickly degrades below the secondary cutoff reference voltage. However, because of the duty cycle change and the backoff of the electrode 20, the ignition voltages of subsequent discharges gradually increase until they reach a level greater than the secondary cutoff reference voltage. When that occurs the comparator 30 again looks like an open circuit, a second control signal appears on output line 46, the transistor 40 is turned off and the primary cutoff reference voltage is again applied to the positive input of the comparator 30. When that occurs, the servo drive mechanism 22 no longer backs the electrode 20 off but rather moves it towards the workpiece 12 along its programmed path. Furthermore, the duty cycle of the pulse generator circuit 18 is increased to its normal operating level.

Therefore, it can be seen that the primary reference cutoff voltage operates as the reference when the ignition voltages are decreasing and the secondary cutoff voltage operates as the reference when the ignition voltages are increasing to provide a dynamic reference voltage change which prevents the electrode 20 from backing off away from the workpiece 12 an inordinate amount as done in the prior art.

By looking at the envelope defined by the ignition voltages in the gap between the electrode 20 and the workpiece 12, gap contamination problems can be sensed quickly and in an economical fashion without excessive wear to the electrode 20. Furthermore, because the envelope is electrically monitored there is no need to shift reference levels when electrode or workpiece material is changed.

Referring to the remainder of the circuitry illustrated in FIG. 1 the circuitry is disclosed in detail in patent application entitled "Electric Discharge Machining Apparatus Including Servo Control Circuit" U.S. Ser. No. 702,144 having the same Assignee as the present application and filed on even date herewith.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

What is claimed is:

1. An electrical discharge machining apparatus comprising:

first generating means for generating intermittent electrical discharges between an electrode and an electrically conductive workpiece, each of said discharges having a voltage waveform including an ignition voltage and a cutting voltage, the value of the cutting voltage being less than the value of the ignition voltage;

regulating means for regulating the relative displacement between the electrode and the workpiece;

conditioning means for conditioning the voltage waveforms to provide a conditioned voltage signal related to the magnitude of the ignition voltages, the magnitude of the ignition voltages defining a discharge envelope;

second generating means for generating in succession first and second reference voltage signals, the value of the first reference voltage signal being greater than the value of the second reference voltage signal; and determining means for determining when the value of the conditioned voltage signal falls below the value of the first reference voltage signal and providing a first control signal, said second generating means automatically stopping generation of said first reference signal and starting generation of said second reference voltage signal in response to said first control signal wherein said regulating means is responsive to said first control signal to increase the displacement between the electrode and the workpiece, the duty cycle of said first generating means decreasing in response to said first control signal and wherein said determining means determines when the value of the conditioned voltage signal is greater than the value of the second reference voltage signal and providing a second control signal, said second generating means automatically stopping generation of said second reference signal and starting generation of said first reference signal in resposne to said second control signal, said regulating means decreasing the relative displacement between the electrode and the workpiece in response to the second control signal and the duty cycle of said first generating means increasing in response to the second control signal whereby said second generating means provides a dynamic reference voltage signal to prevent the electrode from backing off from the workpiece an inordinate amount when a contamination problem exists in the gap between the electrode and the workpiece.

2. The apparatus as claimed in claim 1 wherein the first generating means is responsive to said first and second control signals to respectively increase and decrease the time period between successive electrical discharges.

3. The apparatus as claimed in claim 1 wherein said conditioning means comprises a peak detector and averaging circuit.

4. The apparatus as claimed in claim 1 wherein said determining means includes a voltage comparator coupled to said conditioning means for alternately comparing the value of the conditioned voltage signal with the value of said first and second reference voltage signals.

5. The apparatus as claimed in claim 4 including switch means coupled to the output of said comparator and responsive to said first and second control signals for alternately switching said first and second reference voltage signals at one input of said comparator.

* * * * *